United States Patent [19]

Elbers

[11] Patent Number: 4,537,812
[45] Date of Patent: Aug. 27, 1985

[54] CORRUGATED SPACERS FOR PLEATED AIR FILTER MEDIA

[75] Inventor: Richard W. Elbers, Syracuse, N.Y.

[73] Assignee: Cambridge Filter Corporation, Syracuse, N.Y.

[21] Appl. No.: 562,372

[22] Filed: Dec. 16, 1983

Related U.S. Application Data

[62] Division of Ser. No. 505,541, Jun. 17, 1983.

[51] Int. Cl.³ .......................... B32B 3/28; B32B 3/02
[52] U.S. Cl. ..................................... 428/182; 55/497; 55/500; 428/184; 428/192
[58] Field of Search ............... 428/192, 182, 184, 179; 55/497, 500, DIG. 5; 210/493.1, 493.5

[56] References Cited

U.S. PATENT DOCUMENTS

| | | | |
|---|---|---|---|
| 2,720,937 | 10/1955 | Root, Jr. | 55/500 |
| 3,146,197 | 8/1964 | Getzin | 55/497 |
| 3,293,833 | 12/1966 | Barany | 55/500 |
| 4,227,953 | 10/1980 | Wasielewski et al. | 55/497 |

FOREIGN PATENT DOCUMENTS 2617356 11/1977 Fed. Rep. of Germany ........ 55/500

*Primary Examiner*—Paul J. Thibodeau
*Attorney, Agent, or Firm*—Charles S. McGuire

[57] ABSTRACT

An improved corrugated sheet aluminum spacer for use in pleated media air filters is disclosed. The spacers are folded in zig zag fashion along one edge in a succession of V formations having a first height and width, and along the opposite edge in a succession of V formations having both heights and widths approximately one-fifth of the first height and width. Since the fold lines are substantially parallel, there are five V formations within a given width of the opposite edge for each one along the first edge, the fold lines of the intermediate V formations extending from the second edge only a portion of the distance to the first edge, but preferably about 90% of the length of the sheet. The V formations are formed by passing the aluminum between a pair of rolls with forming blades having overlapping edges which engage the sheet. The height or amplitude of the V formations at the small end is on the order of 0.03 to 0.04 inches in aluminum sheet having a thickness of 1 to 2 mils, preferably 0.0015 inches. The 5 to 1 ratio of V formations along opposite edges is achieved by polishing the surfaces of the forming blades which contact the sheet to a degree providing surface irregularities of not more than about 10 microinches, preferably in the range of 4 to 8 microinches.

5 Claims, 12 Drawing Figures

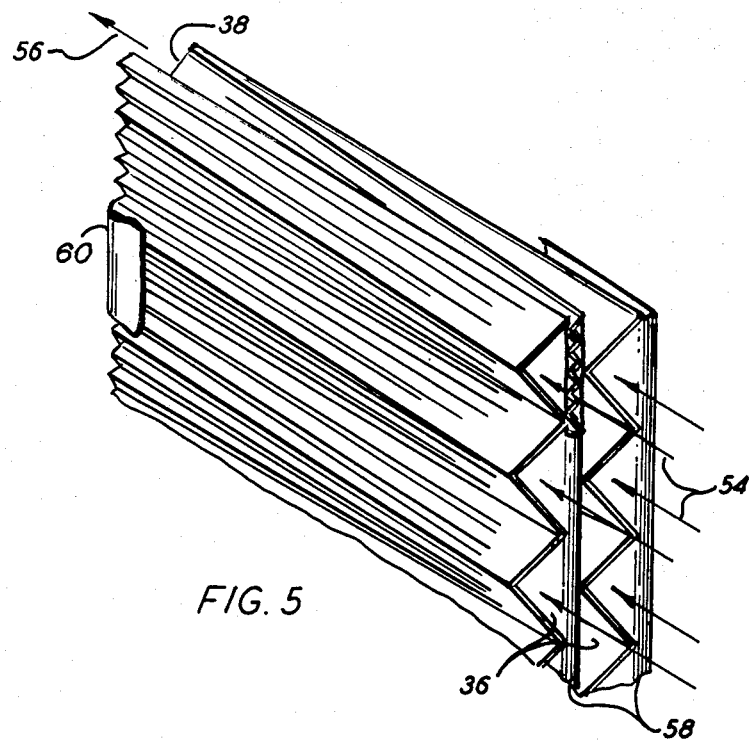
FIG. 5
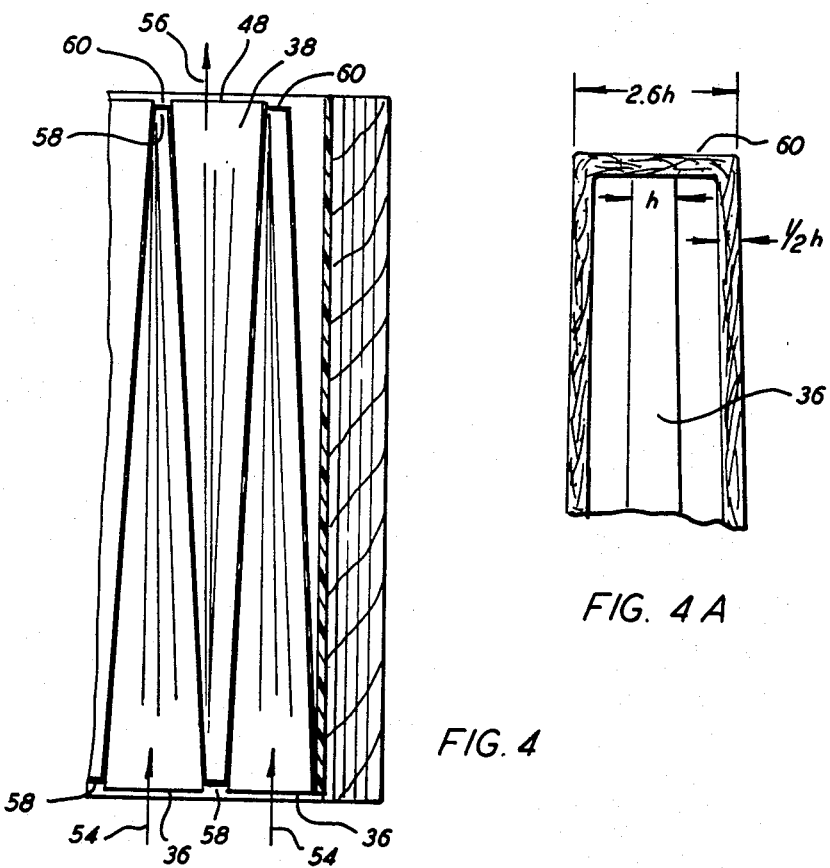
FIG. 4A
FIG. 4

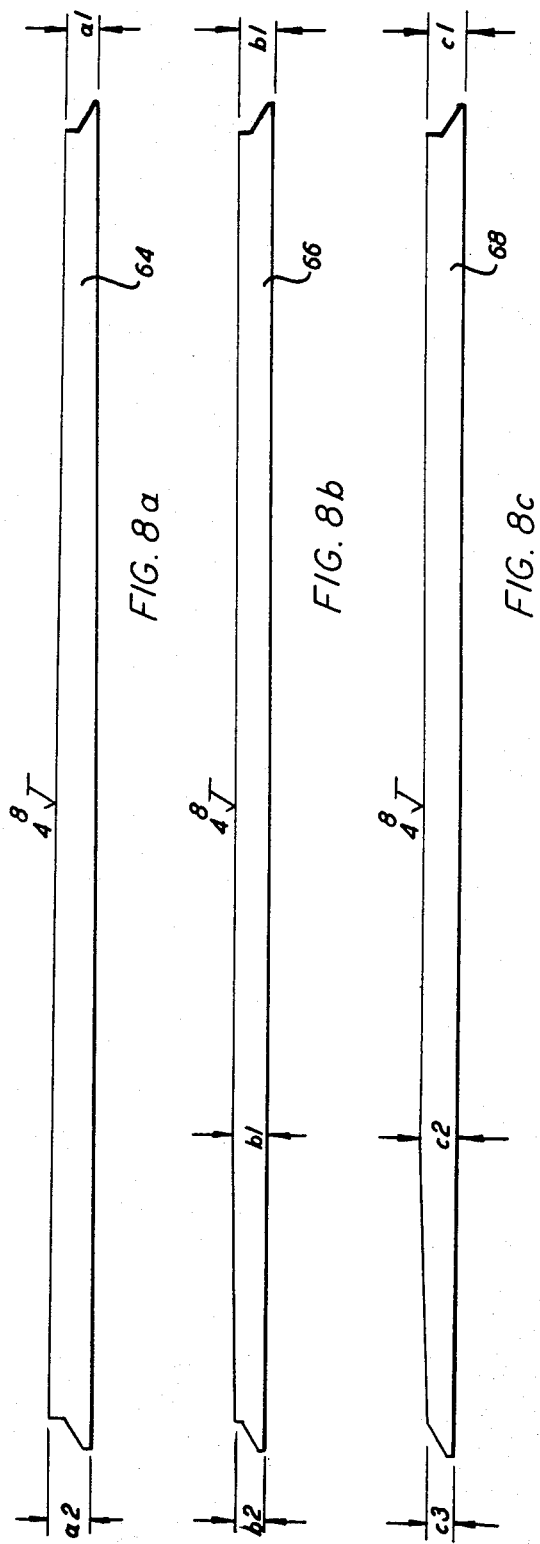

CORRUGATED SPACERS FOR PLEATED AIR FILTER MEDIA

REFERENCE TO RELATED APPLICATION

This is a division of application Ser. No. 505,541, filed June 17, 1983.

BACKGROUND OF THE INVENTION

The present invention relates to tapered, corrugated spacer members of the type commonly used to maintain a desired spacing between successive folds or pleats of accordion pleated, high-efficiency air filter media. More specifically, the invention relates to a novel form of such spacer members, folded in zig-zag fashion along parallel lines with a greater number of V formations within a given width along one edge of the sheet than previously achieved in practise.

In a common commercial form of high efficiency air filter, a length of filter media is folded in accordion fashion to provide a succession of V-shaped pleats, and sealed about its periphery to an open, rectangular frame. The surfaces of adjacent pleats are often spaced by less than 2/10ths of an inch at the open end, i.e., at the widest spacing, and gradually merge to the closed end. Consequently, it is necessary to place spacer means between each of the adjacent media walls to maintain the air flow through the filter at the highest volume and lowest pressure drop commensurate with the desired efficiency level.

Corrugated sheets of aluminum, or other materials, which are tapered in some manner from one edge of the opposite edge have long been utilized to provide the necessary spacing of the media pleats in such filters. For example, U.S. Pat. No. 2,720,937 of Root, Jr. discloses spacer members of the type referred to, as do Patent Nos. 3,146,197 of Getzin and 3,293,833 of Barany. The present invention is most closely related to the latter of these and represents an improvement in that a more gradual taper is provided, down to a smaller amplitude, as will later become apparent.

The ratio of the amplitudes, i.e., the linear distance between parallel lines extending laterally of the spacers through the successive fold lines on each side, along the two opposite edges having the V formations, is the same as the ratio of the number of V formations within a given width at the opposite edges. That is, in order to maintain parallel fold lines, if three V formations are made at one edge for every one V formation at the other, the height at the small amplitude edge will be one-third of that at the high amplitude edge. Likewise, if five V formations are made at the small amplitude end for every one at the large amplitude end, the ratio of both amplitudes and number of V formations within a given linear distance will be five to one.

Although the advantages of a 5 to 1 ratio over a 3 to 1 ratio in tapered separators of this type has long been recognized, and Barany Pat. No. 3,293,833 states that the ratio may be any odd whole number, it has never been possible in practise to fabricate satisfactory spacers with forming rolls and blades such as shown in the patent having a higher than 3 to 1 ratio. That is, U.S. Pat. No. 3,293,833, and its companion U.S. Pat. No. 3,311,526 covering the preferred form of apparatus for fabricating the spacers, both of which are assigned to applicant's assignee, imply that the ratio may be changed merely by increasing the number of small amplitude forming blades on each side of the large amplitude blades. However, when this was attempted in forming spacers having large amplitude folds in the dimensional range required, many breaks and cracks occurred along the small amplitude edge. Spacers having such breaks or cracks are unsuitable for use since the burrs and sharp edges may tear or perforate the filter media, rendering the entire filter pack unacceptable.

Furthermore, in order to provide spacers having the necessary rigidity and resistance to flattening after the V formations have been made, it is desirable to use aluminum sheet of some minimum hardness, consistent with the requirement that the formed spacers be essentially free of breaks and cracks. In the past, it was considered unfeasible to produce a spacer with a 5 to 1 taper ratio, even with soft aluminum, having some capability of stretching without breaking.

It is also a desireable feature that the spacers not only have a higher ratio of amplitude from high to low end, but also that the taper be as even as possible from end to end. Although the V formations extending completely from end to end of the spacers, i.e., those fold lines included at the high amplitude end, may exhibit such gradual taper, the fold lines forming the intermediate V formations at the low amplitude end cannot extend entirely to the high amplitude end if the high amplitude V formations are to be maintained. Consequently, in order to achieve the most even and gradual taper, the fold lines forming the intermediate fold lines at the low amplitude end should extend to a point about 80% to 90% of the distance from the low to the high amplitude edge. Although the spacers are shown in aforementioned U.S. Pat. No. 3,293,833, particularly in FIG. 4, as having intermediate fold lines extending about 90% of such distance, in actual practise spacers commercially produced over the past 20-odd years have not been able to achieve configurations wherein the intermediate fold lines extended more than about 35% to 50% of the distance from low to high amplitude ends.

Thus, while the advantages and desireability of corrugated aluminum spacers tapering from a desired amplitude at one end to approximately 1/5 that amplitude at the other have long been recognized, satisfactory spacers of this type have never been produced on a commercial scale by the preferred means of passing aluminum sheet between a pair of rotating rolls having forming blades to engage and fold the sheet material. Also, spaces having the desired high degree of hardness, and intermediate fold lines extending from the low amplitude end to a point about 90% of the distance to the high amplitude end have not been achieved in commercial practise.

It is a principal object of the present invention to provide high efficiency air filters of the accordion-pleated media type wherein consecutive pleats are held in spaced relation at the open end on both upstream and downstream sides and taper more evenly from the open end to a sharper fold at the closed end than similar prior art units.

It is a further principle object to provide an article of manufacture in the form of a corrugated aluminum sheet folded in zig-zag fashion along substantially parallel fold lines to provide a succession of V formations of uniform width and amplitude along one edge and V formations of substantially 1/5 said uniform width and spacing along the opposite edge, where the amplitude is on the order of 0.03 to 0.04 inches.

It is a further object to provide a corrugated aluminum spacer for accordion-pleated air filters which is folded by forming blades on rotating rolls between which the aluminum sheet is passed, such folds having a much lower amplitude than prior art spacers without a significant number of cracks, tears or breaks in the formed spacer.

Another object is to provide a zig-zag folded spacer of the type referred to, having a 5 to 1 ratio of amplitude from high to low end, with a substantially even taper in that the fold lines forming the intermediate V formations at the low amplitude end extend approximately 90% of the distance to the high amplitude end.

Other objects will in part be obvious and will in part appear hereinafter.

SUMMARY OF THE INVENTION

The foregoing objects are achieved in the novel filter construction and spacer configuration of the invention essentially through the use of forming blades on the rotating rolls between which the aluminum sheet is passed having longitudinal edge portions which contact and from the fold lines in the sheet which are polished to a high degree. The preferred finish on the blade edges is a 4 to 8 microinch, lapped finish; that is, the polished area of the blade surfaces provides surface irregularities of not more than 4 to 8 microinches. The aluminum sheet, preferably fed from a continuous roll initially in flat form, is provided with a zig-zag configuration along two opposite edges by fold lines substantially parallel to one another and to the other two edges. For every one zig-zag fold, or V formation, along one edge there is a total of five such V formations along the opposite edge. Accordingly, the V formations along the one edge have a height or amplitude five times that of the V formations along the opposite edge. The fold lines forming the V formations along the one edge extend completely to the opposite edge, with the fold lines forming the additional four V formations extending from the opposite edge approximately 80% to 90% of the distance to the first edge. Also, the material of the spacers is sheet aluminum having a thickness of between about 1 and 2 mils, preferably 0.0015 inches, an amplitude at the small end between about 0.03 inches and 0.04 inches, and a hardness of H19, 1145 aluminum.

The spacers having the foregoing configuration and properties are placed consecutively between each fold of an accordion-pleated filter media to provide a high efficiency filter pack of improved configuration and operating characteristics. Since the amplitude at the low end of the spacers is only 1/5 that at the high end, rather than ⅓, as in the case of the best prior art, the closed end of the media which is folded around the low amplitude end of the spacers extends to a much sharper fold than in prior art filter packs of this type. Also, the pleat walls or flanks of the media are maintained in a more exactly planar configuration, all resulting in lower pressure drop across the media while maintaining the same efficiency and flow rate.

BRIEF DESCRIPTION OF THE DRAWINGS

FIG. 4 is a fragmentary, sectional, side elevational view of a portion of the filter pack of FIG. 1;

FIG. 4A is a greatly enlarged fragment of FIG. 4;

FIG. 5 is an enlarged, fragmentary perspective view of the filter media and spacers;

FIGS. 8a, 8b and 8c are side elevational views of the three configurations of forming blades used in the rolls of FIGS. 6 and 7.

DETAILED DESCRIPTION

Figure 1:
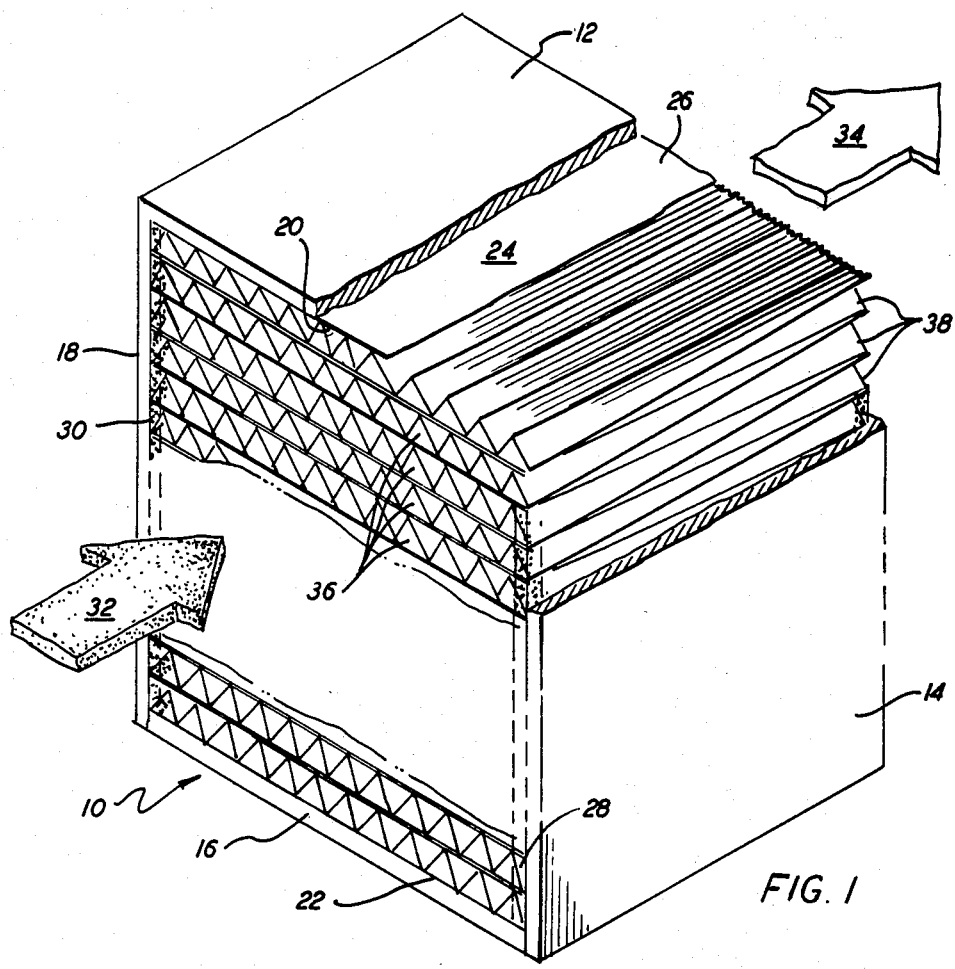
FIG. 1 is a perspective view of an air filter pack embodying the invention, with portions broken away.

Referring now to the drawings, in FIG. 1 is shown a filter unit or cartridge, designated generally by reference numeral 10, representing generally a type of high efficiency air filter which has been in widespread commercial use for many years. Filter 10 includes a frame in the nature of an open-ended box having rigid, planar sides 12, 14, 16 and 18 of wood or metal. Sealably mounted within the frame is a continuous sheet of conventional filter media, folded in accordion fashion to form a plurality of pleats extending back and forth between the open ends of the frame. The terminal edges of the pleated media are shown at 20 and 22.

The pleat side or flank indicated by reference numeral 24, which extends from edge 20 to fold 26 is glued, or otherwise sealably affixed, to the inside surface of frame side 12. The pleat flank extending from terminal edge 22 is likewise sealed to frame side 16. The zig-zag side edges of the media which extend the full depth of the filter are sealed to frame sides 14 and 18 in any suitably effective manner, for example according to the teachings of U.S. Pat. No. 4,227,953 of Wasielewski and Hladik, assigned to applicant's assignee, wherein such edges are embedded in a layer of adhesive material, such layers being shown at 28 and 30.

One or more such filter units are installed in an opening in a wall, ceiling, or other solid barrier with suitable, air-tight sealing means between the filter frame and barrier, whereby an air or other gas passing from an upstream to a downstream side of the barrier must pass through the filter media. Unfiltered air entering the filter from the upstream side is indicated by arrow 32, and filtered air on the downstream side by arrow 34. The air enters between the filter media pleats which open toward the upstream side and passes through the pleat flanks and exits between pleat folds opening toward the downstream side, all of the foregoing being in accordance with conventional practise.

In order to maintain the pleated media walls in the desired configuration, tapering gradually from open to closed ends, it has long been standard in the industry to provide corrugated sheets which taper from higher amplitude corrugations along one edge to lower corrugations at the other, which are placed between each media pleat. Such corrugated sheets, constructed as explained later in more detail, are shown in FIG. 1, those inserted between pleats opening toward the upstream side being indicated by reference numeral 36 and those between pleats opening toward the downstream side by numeral 38. It will be understood that the dimensions of the spacers relative to that of the entire filter pack have been greatly exaggerated in FIG. 1 in order that the elements may be seen more clearly. In actual practise, the number of media pleats which would typically be utilized in a filter pack 22½ inches in height, would be in the range of 90 to 110, with two spacers (one upstream and one downstream) for each pleat. Likewise, the number of zig-zag fold at the high amplitude end across one of the spacers would be on the order of 50, instead of the 12 or so shown.

Figure 3:
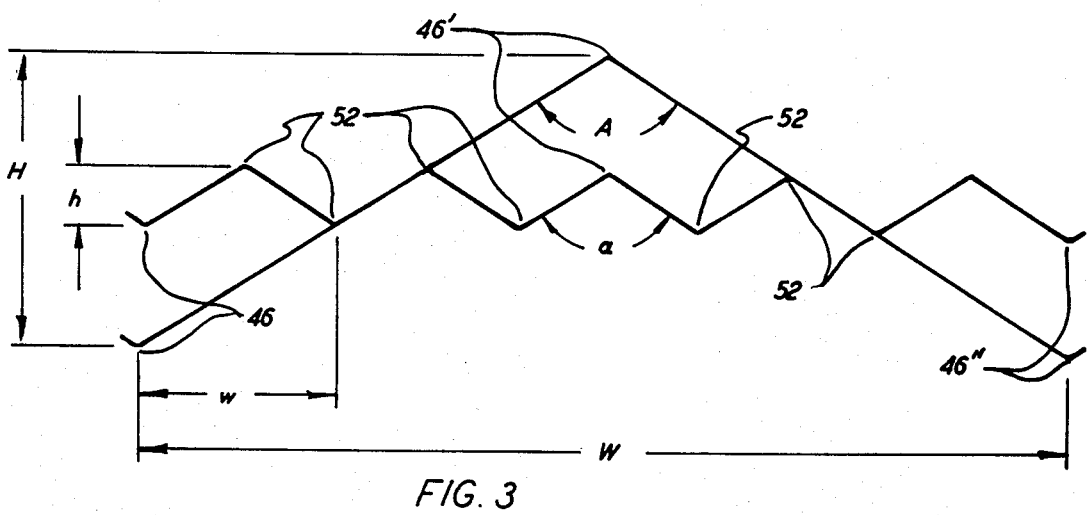
FIG. 3 is an enlarged view of a fragment of a spacer formed as in FIG. 2, showing each of the two opposite, folded edges of the spacer superposed on one another.
Figure 2:
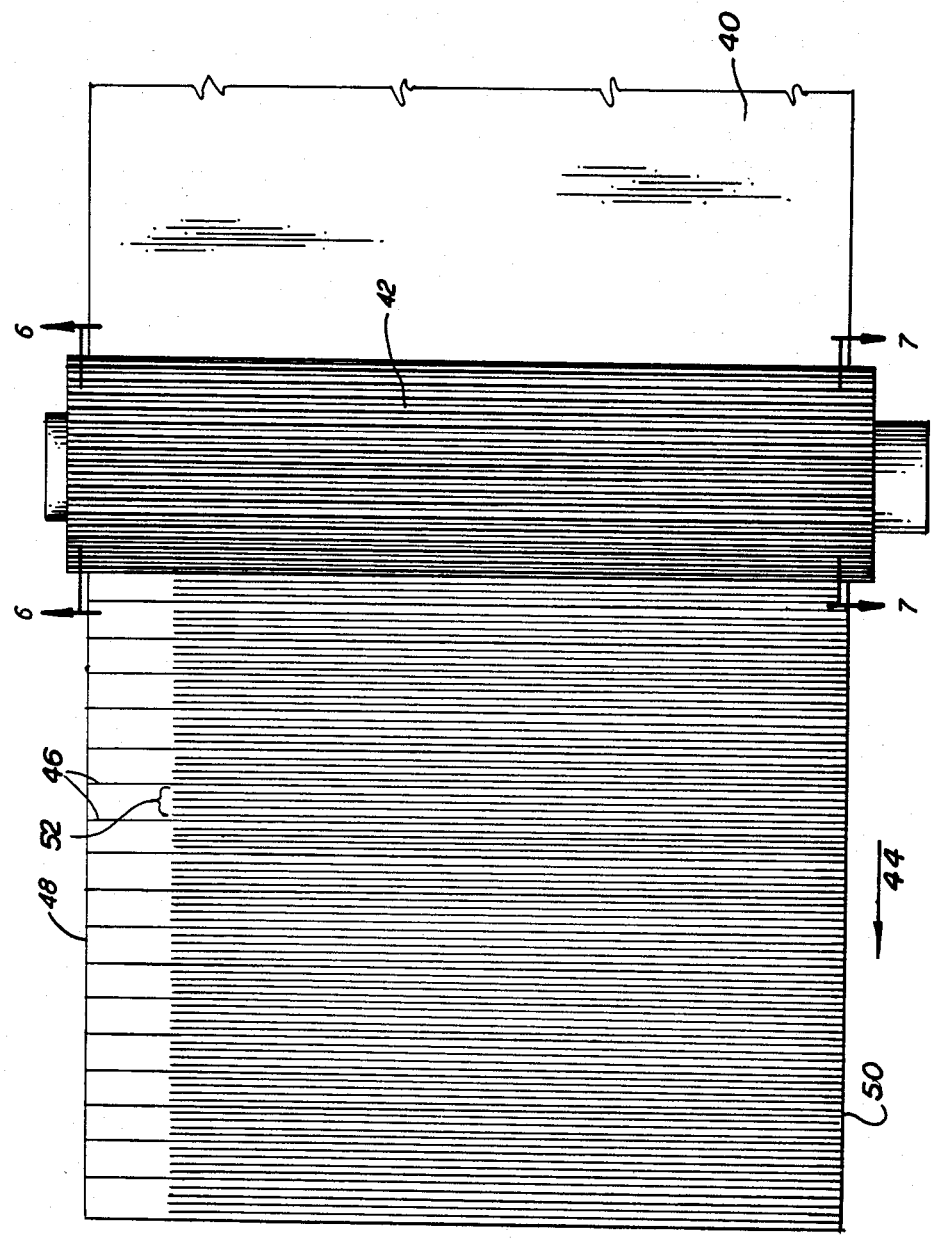
FIG. 2 is a plan view of a strip of aluminum sheet or foil in the process of being folded to form the tapered spacers of the filter pack of FIG. 1.

Turning now to FIGS. 2 and 3, the structure of the spacers will be seen in greater detail. In the preferred method of fabrication of the spacers, a continuous strip of flat aluminum sheet 40 is fed between a pair of rotating, spaced rolls, one of which is shown in FIG. 2, indicated by reference numeral 42, having forming blades projecting radially and extending axially thereof, as described in more detail later herein. In accordance with conventional practise, prior to entering the forming rolls, the edges of the sheet are folded over to provide a so-called "safe-edge", as indicated at edges 48 and 50. As the aluminum sheet comes out of the forming blades it is folded to a zig-zag configuration with fold lines perpendicular to the direction of travel of the sheet, indicated in FIG. 2 by arrow 44. After passing through the rolls, the folded sheet is cut to desired lenghts, corresponding to the width of the filter pack wherein they will be employed.

From FIG. 2 it is apparent that for each of the fold lines 46 which extend fully between the two opposite edges 48 and 50 there are four additional fold lines 52 interposed therebetween, extending from edge 50 about 90% of the distance to edge 48, where they merge into the surface of the sheet. One complete zig-zag fold at edge 48 is shown in the greatly enlarged view of FIG. 3, superimposed upon the same width at edge 50. Here it is seen that the four fold lines 52 which appear at edge 50 between each of fold lines 46, which appear at both edges, result in five zig-zag folds at edge 50 within the same width as the one fold at edge 48. The linear width along edge 48 of one complete zig-zag fold is indicated as dimension W, and the width of one zig-zag fold along edge 50 as dimension w. The heights or amplitudes of the zig-zag folds along edges 48 and 50 are indicated as dimensions H and h, respectively.

The length of the spacer material along edge 48 in one complete zig-zag fold, i.e., the dimension measured from the fold line numbered 46 in FIG. 3, to fold line 46′ to fold line 46″, is termed the "developed length." It is important that the developed length on one complete zig-zag fold at edge 48 be substantially the exact equal of the developed length of five zig-zag folds at edge 50, as shown. For this purpose, the angle of the folds along the two edges will be slightly different. For example, if angle A of the high amplitude folds is about 110°, angle a of the low amplitude folds will be about 91°.

The cooperative relationship of the filter media and spacers may be seen more clearly in FIGS. 4 and 5. Air enters filter unit 10 into the triangular passageways between the upstream media surfaces and the high amplitude zig-zag folds of spacers 36, i.e., those spacers between media pleats opening toward the upstream side of the filter unit, as indicated by arrows 54. After passing through the walls of the filter media, the air exits through the passageways between the media walls and spacers 38, opening toward the downstream side, as indicated by arrows 56. The media is folded around the spacers at low amplitude edge 50, the upstream and downstream media folds being indicated by reference numerals 58 and 60, respectively. It will be noted that the media folds are squared on the ends, which has been found preferable to a sharp crease, as illustrated in the enlarged detail for FIG. 4A. A typical filter unit having external dimensions of 24″×24″ in height and width, and a depth of 12″, may have 105 pleats within the 22⅛″ dimension inside the frame members (the latter each being ¾″ thick). The media in such a unit would have a thickness on the order of 0.015″ and the outside dimension at the folded end would be 3/32″. The amplitude of the spacers at the low end, as previously indicated, is between 0.03 and 0.04 inches, typically 0.036″, indicated in FIG. 4A, as in FIG. 3, as dimension h. Thus, the outside dimension at the folded end of the media is on the order of 2.6 times h, as indicated in FIG. 4a. Since the media thickness is about half the amplitude of the zig-zag folds at the low end (½ h), there will be a space between the media and the spacers totaling about 1½ h at the folded end. The media pleats contact the spacers a short distance from the folded end.

Turning now to FIGS. 6–9, details of the forming blades and rolls will be explained in more detail. Mounted directly opposite roll 42, for rotation about an axis parallel thereto, is roll 62. Rolls 42 and 62 are identical in all respects, including the forming blades carried thereby. The blades are mounted in grooves formed for such purpose in the periphery of the rolls, parallel to the axis thereof. For this purpose, as well as for details of rotatably mounting and driving the rolls, reference is made to previously mentioned U.S. Pat. No. 3,311,526. In the present invention, however, the forming blades are of three distinct configurations, shown individually in FIGS. 8a, 8b and 8c.

The fold lines formed in the spacers, including the amplitude and frequency of such fold lines which establish the final configuration of the spacers, is determined by the blade configuration and the axial spacing of the rolls. Blades 64 form the fold lines 46 which extend completely from one side of the spacers to the other, i.e., fold lines 46. Blades 66 are positioned on each side of blades 64, and two of blades 68 are positioned between each pair of blades 66. The blades and rolls illustrated in FIGS. 6–9 are designed to produce spacers having a high amplitude dimension (H) of 0.165″, a low amplitude dimension (h) of 0.036″, angles A and a of 109°33′ and 91°20′, respectively, with a period or frequency of one complete V formation of 0.480″ at the high end and 0.090″ at the low end (w).

Figure 7:
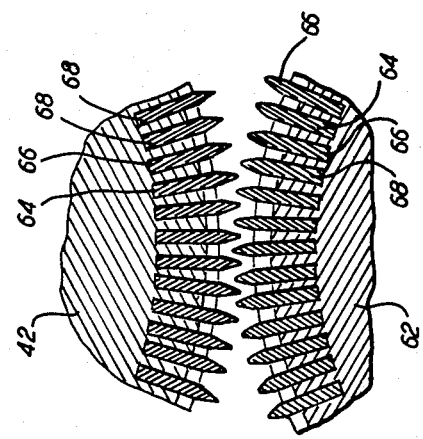
FIGS. 6 and 7 are enlarged, sectional views of the forming blades and rolls, taken on the lines 6—6 and 7—7, respectively, of FIG. 2.
Figure 6:
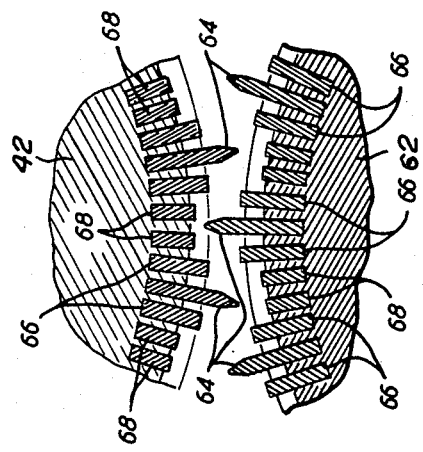

All three blade configurations are of equal height at one end (dimensions a1, b1 and c1), projecting equal distances from rolls 42 and 62, as seen in FIG. 7, in order to form the V formations of equal amplitude along edge 50. Blades 64 taper evenly from this height to a larger dimension a2 in order to form the high amplitude V formations along edge 48. Blades 66 are of constant height (b1) over about 80% of their length and taper over the remaining 20% to a smaller height b2. Blades 68 taper by a small angle (e.g., 0°18′) over about 80% of their length to a smaller height c2 and at a greater angle (e.g., 1°17′) to an even smaller height c3 over the other 20%. The greater tapers of blades 66 and 68 over the 20% or so of their lengths toward the high amplitude end provide the merging of fold lines 52 into the surface of the sheet some 10% of total spacer width from edge 48. As indicated in FIG. 6, blades 64 on one roll are rotationally aligned between two of blades 68 on the opposite roll at the point where the rolls are closest.

Figure 9:
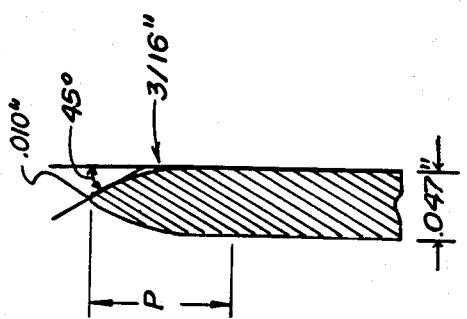
FIG. 9 is an enlarged, fragmentary, end elevation showing details employed in each of the blades.

All three blade configurations have the same cross section, except for the steeper tapered 20% of the length at one end of blades 66 and 68, the preferred cross sectional configuration being shown in FIG. 9. The blades taper from parallel sides at 45° to a radius of 0.010", blended at a radius of 3/16" on each side, as indicated. With blades configured and dimensioned as described, the preferred diameter of the rolls is 2.855". Slots are formed in the rolls, along the axial length thereof, having a width of 0.047" (the blade thickness) and a depth of 0.177". Spacing the slots by 3°36' will provide 100 slots, for holding twenty of blades 64 and forty each of blades 66 and 68'. The blades are retained in known fashion by removable end caps on the rolls and may be individually replaced if worn or damaged. The center-to-center spacing of the rolls is 3.055" for producing spacers of the dimensions indicated herein (0.165" and 0.036" high and low amplitudes), which are used in filter units having 105 media pleats in 22½". The center-to-center distance may be adjusted to vary the spacer dimensions between slightly higher or lower amplitudes, for example, providing spacers suitable for use in filter units having anywhere from 90 to 110 media folds.

The critical feature in the method of fabrication of the spacers is the polishing of the surfaces of all blades which contact the aluminum sheet, e.g., past the tapered surfaces down to about the point indicated in FIG. 9 by dimension p, to a finish of 4 to 8 microinches. This essentially is what makes possible the fabrication of spacers from 1½ mil sheet of acceptable hardness which taper down to a small amplitude of about 0.035" without cracks or breaks.

What is claimed is:

1. An article of manufacture in the form of a corrugated spacer for pleated filter media, said spacer comprising:
   (a) a rectangular sheet of aluminum having a thickness between about 1 to 2 mils and a hardness of not less than H19;
   (b) said sheet being folded in zig-zag fashion with successive folds at evenly spaced intervals forming a succession of V formations along each of first and second opposite edges of said sheet;
   (c) the amplitude and frequency of said V formations along said first edge being substantially constant, first and second dimensions respectively;
   (d) the number of said V formations within a given linear width along said second edge being five times the number within the same width along said first edge, whereby the amplitude and frequency of said V formations along said second edge are substantially 1/5 of said first and second dimensions respectively;
   (e) the fold lines forming said V formations along said first edge extending completely between said first and second edges, parallel to one another and to the third and fourth edges of said sheet; and
   (f) wherein the fold lines forming said V formations along said second edge, in addition to said fold lines extending completely between said first and second edges, extend from said second edge for about 80% to 90% of the distance to said first edge, at which point they merge into the surface of said sheet, substantially parallel to one another and to said fold lines extending completely between said first and second edges, said spacer being essentially free of cracks and breaks.

2. The invention according to claim 1 wherein said amplitude at said second edge is between about 0.030" and 0.040".

3. The invention according to claim 1 wherein said sheet is 1145 aluminum having a hardness of substantially H19.

4. The invention according to claim 3 wherein the included angle of said folds along said second edge is between about 80% and 85% of the included angle of said folds along said first edge.

5. The invention according to claim 4 wherein said amplitude along said second edge is between about 20 and 25 times the thickness of said sheet.

* * * * *